(No Model.)
F. H. BOLTE, T. A. DONLEVY & J. R. CONNELL.
VELOCIPEDE.
No. 558,929. Patented Apr. 28, 1896.
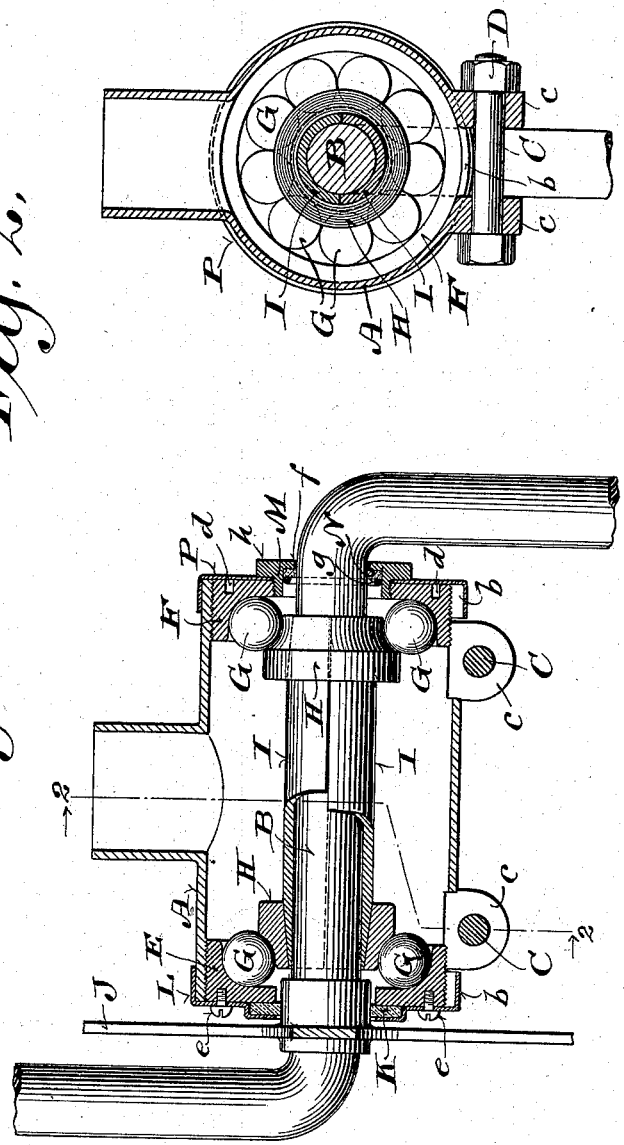

UNITED STATES PATENT OFFICE.

FRANK H. BOLTE, THOMAS A. DONLEVY, AND JAMES R. CONNELL, OF MILWAUKEE, WISCONSIN, ASSIGNORS TO THE BOLTE CYCLE MANUFACTURING COMPANY, OF SAME PLACE.

VELOCIPEDE.

SPECIFICATION forming part of Letters Patent No. 558,929, dated April 28, 1896.

Application filed August 23, 1895. Serial No. 560,194. (No model.)

*To all whom it may concern:*

Be it known that we, FRANK H. BOLTE, THOMAS A. DONLEVY, and JAMES R. CONNELL, citizens of the United States, and residents of Milwaukee, in the county of Milwaukee and State of Wisconsin, have invented certain new and useful Improvements in Velocipedes; and we do hereby declare that the following is a full, clear, and exact description thereof.

Our invention has for its object to cheapen the manufacture of bicycles or analogous vehicles, as well as to reduce weight and lessen friction without decrease of strength, while at the same time we provide an absolute dust-proof hanger for the driving-crank of such a vehicle. Hence said invention consists in certain peculiarities of construction and combination of parts hereinafter set forth with reference to the accompanying drawings, and subsequently claimed.

In the drawings, Figure 1 represents a partly-sectional view of the assembled parts involved in our invention, and Fig. 2 a transverse section taken on line 2 2 of Fig. 1.

Referring by letter to the drawings, A represents the tubular hanger for the driving-crank B of a bicycle or analogous vehicle, said hanger being provided with longitudinal end recesses $b$ of suitable width and depth, in case the arms of said crank are in one piece with the shaft portion of the same, or made fast thereto in such a manner as not to be easy of removal.

Flanking the recesses $b$ of the crank-hanger are depending ears $c$ for the engagement of bolts C, that have clamping-nuts D run thereon, and both ends of said crank-hanger are tapped to engage screw-threaded bearing-rings E F for antifriction-balls G, that also bear on taper-bore cones H, engaging correspondingly tapered ends of a sectional sleeve arranged upon the shaft portion of the aforesaid crank. The sleeve is preferably in two sections I, as a matter of convenience, and by adjusting the bearing-ring F both of the taper-bore cones H are crowded onto the taper ends of said sleeve to thereby clamp the same tight to the shaft portion of the driving-crank. Both of the bearing-rings E F come entirely within the crank-hanger, and to facilitate adjustment of the latter bearing-ring the outer side of the same is provided with recesses $d$ for the engagement of a suitable tool.

Fast on the shaft portion of the crank is the large sprocket-wheel J pertaining to the vehicle embodying our improvements, the hub of this sprocket-wheel being extended through the bearing-ring E and provided, outside the latter, with a dust-guard in the form of a washer K of felt or other suitable material, held in place by means of a cap L, that slips onto the crank-hanger and is preferably fastened to said bearing-ring by screws $e$ or other suitable means. The other bearing-ring, F, is tapped to receive a screw-threaded nut M, having an inwardly-extending flange $f$, that opposes another dust-guard N, similar to the one K above specified. The dust-guard N is on the shaft portion of the driving-crank, and a spring-ring $g$ within the nut M serves to hold said dust-guard in working position.

An outwardly-extending flange $h$ of the nut M opposes a cap P, that is slipped on the crank-hanger, this latter cap and the one aforesaid, together with the guards K N and any suitable means that may be utilized to close so much of the hanger-recesses as are not stopped by the aforesaid bearing-rings, serving to exclude dust from said crank-hanger and ball-bearings.

The shaft and arms of the driving-crank are preferably made from a single steel rod having the same diameter throughout its length, this rod being bent into the desired shape, so as to avoid any forging or toolwork having a tendency to disturb the molecules of the metal and thereby weaken said crank. It is also to be noticed that by the employment of the sectional taper-end sleeve in conjunction with the crank-shaft and cones above specified we avoid screw-threading of said crank-shaft.

The several parts above described having been assembled and adjusted, the nuts D are tightened to prevent turning of the bearing-rings E F, the general construction and arrangement of parts being such that the antifriction-balls G have a greater diameter than those generally employed in a crank-hanger.

Consequently fewer balls are necessary and friction is correspondingly reduced because of a less number of points of contact.

The application of Frank H. Bolte, one of the parties hereto, filed April 8, 1895, Serial No. 544,936, sets forth a combination of a tubular hanger having end recesses of suitable area, a one-piece crank provided with a rigid spacing-sleeve, cones on the crank engaging the spacing-sleeve to turn therewith, bearing-rings contained in the hanger, and antifriction-balls intermediate of the cones and bearing-rings. Therefore, while we have shown all that is thus recited in said application, the same in a generic sense is conceded to be the invention of the said Frank H. Bolte.

Having now fully described our invention, what we claim as new, and desire to secure by Letters Patent, is—

1. The combination of a tubular hanger provided with bearing-rings, at least one of which is adjustable longitudinally thereof, a crank-shaft, a taper-end sectional sleeve on the shaft, taper-bore cones on the ends of the sleeve, and antifriction-balls intermediate of the bearing-rings and cones.

2. The combination of a tubular hanger provided with longitudinal recesses of suitable dimensions, bearing-rings in screw-thread engagement with the hanger, a one-piece crank, a taper-end sectional sleeve on the shaft portion of the crank, taper-bore cones on the ends of the sleeve, and antifriction-balls intermediate of the bearing-rings and cones.

3. The combination of a tubular hanger provided with bearing-rings at least one of which is longitudinally adjustable therein; a crank-shaft, a taper-end sectional sleeve on the shaft, taper-bore cones on the ends of the sleeve, antifriction-balls intermediate of the bearing-rings and cones, dust-guards for the bearings, and suitable means for holding the dust-guards in place.

4. The combination of a tubular hanger provided with bearing-rings at least one of which is longitudinally adjustable therein, a taper-end sectional sleeve on the shaft, taper-bore cones, on the ends of the sleeve, antifriction-balls intermediate of the bearing-rings and cones, a sprocket-wheel on the crank-shaft, a dust-guard on the sprocket-wheel hub opposite one of said bearing-rings, a hanger-fitting cap held in place against the dust-guard, a nut engaging the other bearing-ring, a spring-ring within the nut, another dust-guard intermediate of the spring-ring and a flange of the nut, and another hanger-fitting cap held in place by said nut.

In testimony that we claim the foregoing we have hereunto set our hands, at Milwaukee, in the county of Milwaukee and State of Wisconsin, in the presence of two witnesses.

F. H. BOLTE.
T. A. DONLEVY.
J. R. CONNELL.

Witnesses:
N. E. OLIPHANT,
JOHN J. McGINN.